United States Patent [19]

Eisemann

[11] Patent Number: 4,498,161
[45] Date of Patent: Feb. 5, 1985

[54] DISC PLAYER

[75] Inventor: Kurt Eisemann, Berlin, Fed. Rep. of Germany

[73] Assignee: U.S. Philips Corporation, New York, N.Y.

[21] Appl. No.: 479,304

[22] Filed: Mar. 28, 1983

[30] Foreign Application Priority Data

Mar. 27, 1982 [DE] Fed. Rep. of Germany ....... 3211358
Mar. 27, 1982 [DE] Fed. Rep. of Germany ....... 3211359

[51] Int. Cl.³ .......................... G11B 1/00; G11B 25/04
[52] U.S. Cl. .................................. 369/75.2; 369/77.2; 369/270
[58] Field of Search ................ 369/75.1, 75.2, 77.2, 369/270, 191, 271

[56] References Cited

U.S. PATENT DOCUMENTS 3,223,422 12/1965 Ernst ................................. 369/270
4,098,511  7/1978 Leedom ............................ 369/77.2
4,124,866 11/1978 Coleman .......................... 369/191
4,416,003 11/1983 Suzuki .............................. 369/270

FOREIGN PATENT DOCUMENTS 76583   4/1983 European Pat. Off. ........... 369/77.1
52-76013 6/1977 Japan ................................. 369/270

Primary Examiner—Steven L. Stephan
Attorney, Agent, or Firm—Robert S. Smith

[57] ABSTRACT

The invention relates to a disc player for a rigid information-carrying disc, which player comprises a turntable which is mounted for rotation on a chassis. The disc player comprises a pivotal lid for closing the player, which lid carries an annular disc loader which when the lid is pivoted towards the turntable urges the disc resiliently against the turntable. The lid is closed in two stages. In a first, loading stage in which the lid is pivoted towards the turntable and in a consecutive lifting stage, the lid is resiliently pivoted away from the turntable towards a final position, in which final position the disc loader is clear of the disc. The lid is positioned by stop means, and a return of the lid to the loading stage is inhibited by a latch.

8 Claims, 7 Drawing Figures

DISC PLAYER

The invention relates to a disc player for a rigid information-carrying disc, the player comprises a turntable which is mounted for rotation on a chassis and a lid for closing the player, the lid is pivotally connected to the chassis and carries a disc loader which when the lid is pivoted towards the turntable acts resiliently on the turntable.

A disc player for a rigid information-carrying disc which is played on a turntable is known from German Offenlegungsschrift No. 29 21 410. During operation the information-carrying disc is retained on the turntable and the turntable is rotated by a drive motor. The lid of the player carries a disc loader which resiliently cooperates with the information-carrying disc via a magnetic ring. When the lid is closed the magnetic ring acts on the disc and retains it during playing. This is possible because the disc loader is mounted for rotation in the lid of the player. This requires a special mechanical construction and moreover it is an additional load on the turntable drive.

In order to enable a fully unimpeded rotation of the turntable with the information-carrying disc it would be advantageous to pivot the lid with the disc loader slightly away from the turntable after the disc has been urged into position. However, with the known player the lid would be swung back and the disc would be loaded again immediately after such a movement, which could result in damage to the rapidly rotating information-carrying disc.

It is the object of the invention to provide a disc player for a rigid information-carrying disc in which the disc loader does not impede the rotation of the turntable so as to preclude damage to the disc by the disc loader.

According to the invention this is achieved in that during closure the lid performs a pivotal movement in two stages, the lid carries at least one stop element and in a first, loading stage is pivoted towards the turntable, during which the disc loader urges the disc against the turntable, and in a second, lifting stage consecutive to the loading stage is pivoted away from the turntable by resilient means which are coupled to the lid, into a final position in which the lid is positioned by stop means, in which the disc loader is clear of the disc, and in which a latch which is movable relative to the chassis moves to a position in the pivotal path of the stop element, and inhibits a return to the loading stage.

If after the disc has been urged into position in the subsequent lifting stage the resilient means have lifted the lid of the disc player so far from the information disc that the disc loader is clear of the disc, the latch which in the meantime has reached the position under the stop element inhibits a return of the lid to the loading stage in which the disc loader would again bear on the information-carrying disc. This is possible only after the lid has been moved to the open position.

In a further embodiment of the invention a carrier is pivotally connected to the chassis and in the loading stage is pivoted with the lid towards the turntable, which carrier, carries a latching plate which at the end of the loading stage is latched by a latching member which is connected to the chassis, said carrier comprising a part of the stop means which in the latched position of the carrier limit the pivotal movement of the lid in the lifting stage and keep the lid in the final position.

This results in a disc player in which after latching at the end of the loading stage the carrier allows the lid to pivot freely during the subsequent lifting stage, so that the disc loader is lifted off the disc until the stop means on the carrier position the lid in its final position.

In this respect another embodiment of the invention is characterized in that the latching member carries the latch and in the loading stage of the lid is moved away from the carrier by the pivotal movement of the latching plate towards the turntable, the latch being moved to a waiting position, and after the loading stage the latching member is reset under spring force, the latch being moved under the stop element inhibiting a return of the lid to the loading stage. This ensures that during the loading stage of the lid the latch is moved out of the path of the stop element on the lid towards the first position at the correct instant, so that the lid can pivot freely towards the turntable, while after the loading stage the latch is automatically returned to the working position under spring force.

The latch may be constructed in various ways. In one embodiment of the invention the latch is constructed as an element which can deflect resiliently relative to the latching member which is constructed as a slide, arranged on the chassis. This construction only allows the latch to be moved from the first to the second position when the latching member has been reset.

Another embodiment of the invention is characterized in that the latching member is provided with a button for releasing the carrier and opening the lid. Thus, the lid can be opened and the latch on the latching member can be reset by means of the button.

In another embodiment of the invention, characterized in that the latch comprises a first and a second wall on opposite sides, the first wall keeping the latching plate of the carrier latched during the second, lifting stage of the lid and the second wall, which is disposed in the pivotal path of the stop element of the lid, inhibiting a return of the lid to the loading stage. This latch serves both for latching the carrier and thus the lid and inhibits a movement of the lid out of the final position.

In this respect another embodiment of the invention is characerized in that the latching plate on the carrier comprises a pivotal plate which keeps the latch of the latching member in the waiting position via a wall portion during a part of the loading stage and, at the end of the loading stage, is pivoted against spring force towards pivoted position by the stop element on the lid, so that the latch moves to the position under the stop element and the carrier is latched thereby. Thus, the carrier is latched simultaneously with the movement of the latch to the position under the stop element.

Embodiments of the invention will now be described in more detail, by way of example, with reference to the drawing. In the drawing.

Figure 1:
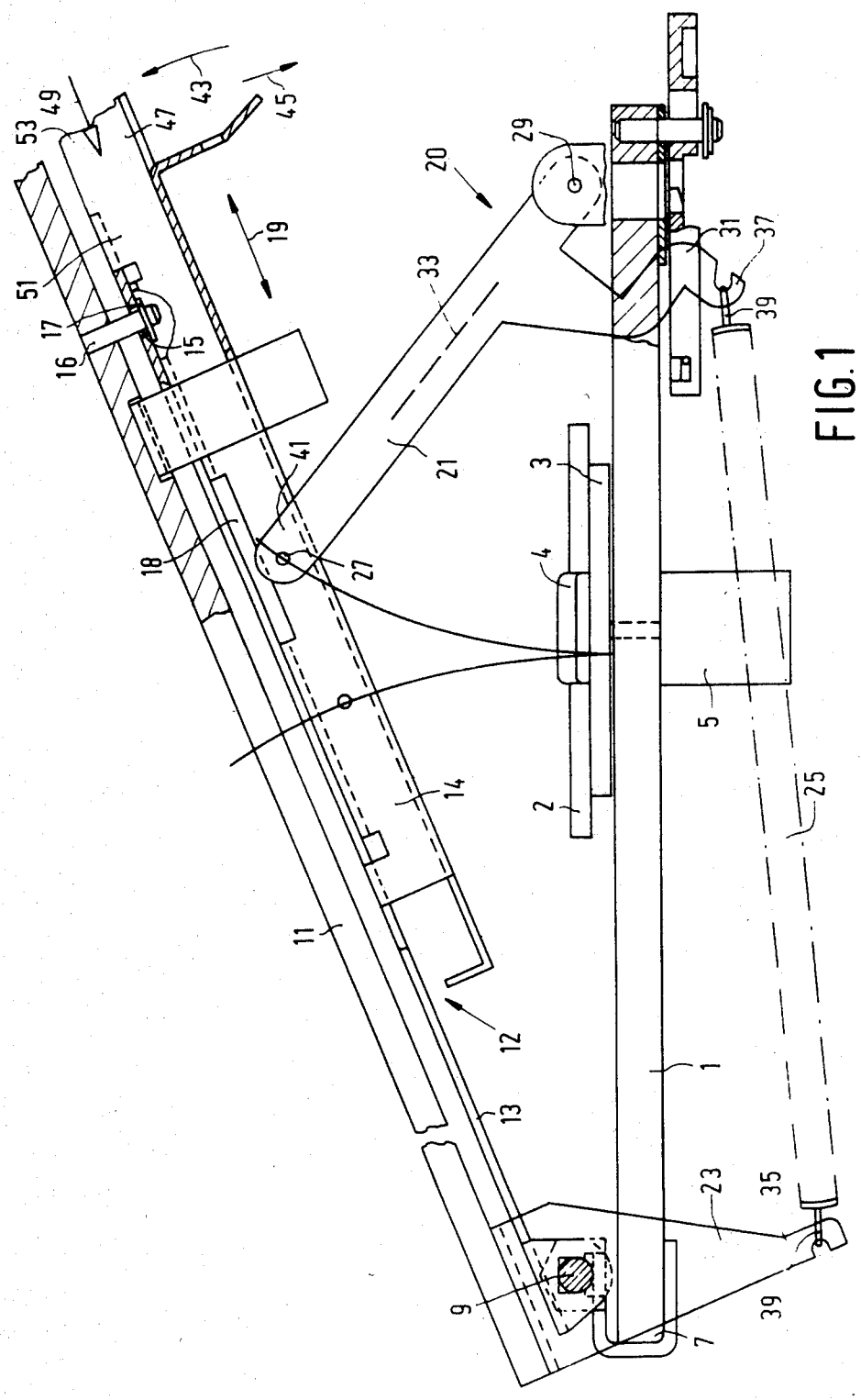
FIG. 1 is a side view of a part of a disc player in accordance with the invention.

A turntable 3 and a disc-centring device 4, shown schematically, are rotatably journalled on a chassis 1 of a disc player, shown in FIG. 1, for playing a rigid information-carrying disc 2. The turntable 3 can be driven by means of a drive motor 5 arranged underneath the turntable. Near a side 7 of the chassis 1 a lid 11 is pivotally connected to the frame by means of a hinge 9. For protecting the turntable 3 the lid 11 can be moved from an open position shown in FIG. 1 to a final position shown in FIG. 4, in which the lid extends substantially parallel to the turntable.

Figure 4:
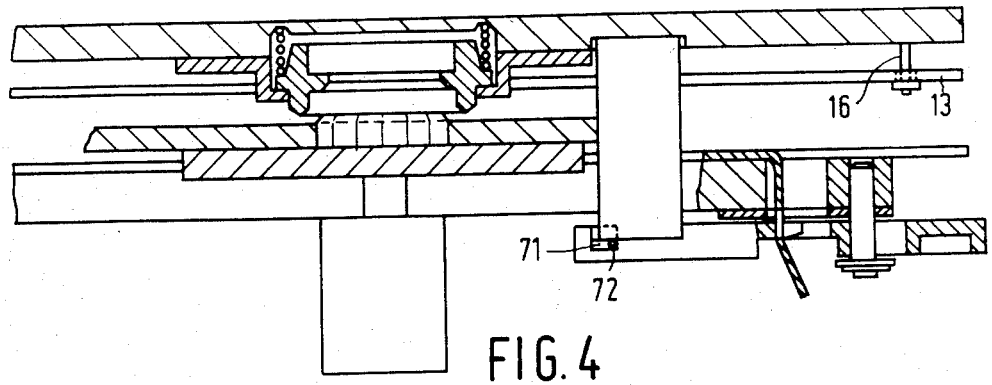

The hinge 9 also serves for pivotally mounting a carrier 12, which comprises a carrier plate 13 and a slide 14. The carrier plate 13 is formed with two apertures 15, through which pins 16 extend which are rigidly connected to the lid 11. As is shown in FIGS. 1 and 4 retaining rings 17 are positioned against the carrier plate 13 when the carrier 12 and the lid 11 are pivoted relative to each other. The apertures 15 with the adjacent wall portions of the plate 13 and the rings 17 constitute stop means for limiting the pivotal movement of the carrier 12 and the lid 11 relative to each other.

The slide 14 is slidable relative to the carrier plate 13 by means of rails 18 on the two edges of the carrier plate 13. The slide 14 is movable in the directions indicated by the double arrow 19.

For moving the slide 14 there are provided two level devices 20, one on each side of the chassis 1. Each device 20 comprises an arm 21 and a lever 23, which are interconnected by spring means which comprise a tension spring 25 and which are disposed underneath the chassis 1. In the position shown in FIG. 1 the arm 21 occupies an oblique position relative to the chassis 1, which position is inverted relative to the oblique position of the lid 11, and the arm is pivotally connected to the slide 14 by means of a pivot 27 and to the chassis 1 by means of another pivot 29. Moreover, the arm 21 comprises an extension member 31 which extends to a point underneath the chassis 1 perpendicularly to the axis 33 of the arm 21.

Near the pivot 9 the lever 23 is secured to the lid 11 and extends from the lid to a point underneath the chassis 11. Free ends 35 and 37 of the lever 23 and the extension member 31 respectively are both disposed underneath an imaginary line connecting the pivots 9 and 29. The tension spring 25 is attached to the free ends 35 and 37 by lugs 39.

Each lever device 20 is constructed in the above manner, in such a way that as the lid 11 is pivoted away from the turntable 3 in the direction of an arrow 43 an end portion 41 of the arm 21 moves the slide 14 in the direction indicated by the right-hand arrow 19 in FIG. 1 via the pivot 27 and, when the lid 11 is closed in the direction indicated by the arrow 45 it moves the slide 14 in the opposite direction. A guide arrangement near the side walls 47 of the slide 14 is constructed in such a way that an information-carrying disc 2, which is inserted in the direction of an arrow 49 into a compartment 51 between the carrier plate 13 and the slide 14, accurately engages the centering device 4 of the turntable 3 with its central hole when the lid 11 is closed in the direction of the arrow 45. When the lid 11 is in the swung-open position shown in FIG. 1, the information-carrying disc 2 can be removed through a slot 53 in the compartment 51.

Figure 2:
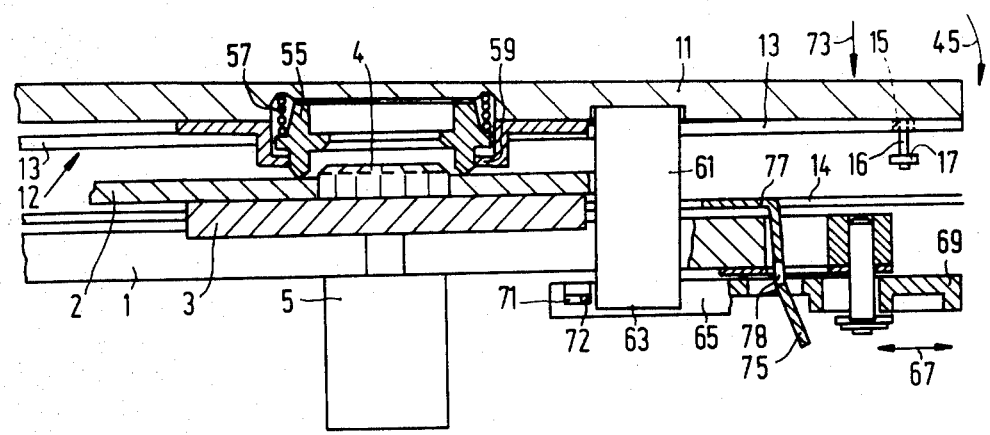
FIGS. 2–4 are side views, part sectional views of the relevant parts of the disc player of FIG. 1 in three different positions.
Figure 3:
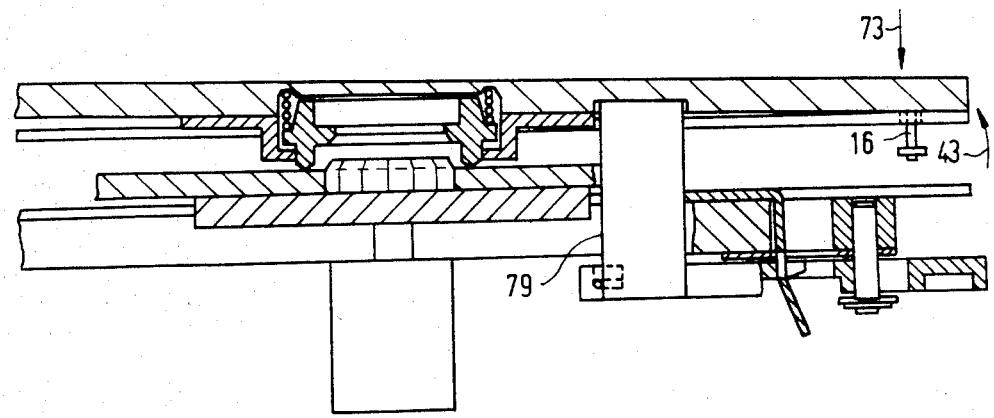

As is shown in FIGS. 2-4 the lid 11 of the disc player carries a spring-mounted disc loader 55, which is urged against a stop ring 59 on the lid by means of a helical compression spring 57 and which extends through an aperture in the carrier plate 13.

At least one thrust member 61 is rigidly connected to the lid 11, which member projects from the lid towards the chassis 1. The lower end 63 of the member 61 forms a stop element for the pivotal movement of the lid 11. Suitably, one member 61 is arranged on each side of the lid 11, although a construction is described which employs only one member on one side of the lid.

A latching member in the form of a slide 65 is arranged on the chassis 1 so as to be slidable in directions indicated by a double arrow 67. The slide 65 is provided with a button 69 which enables external actuation of the slide, so that it is pressed inwards. A wire spring 72 is arranged in a slot 71 in the slide 65. As can be seen in FIG. 2, the spring 72 assumes a position in the slot 71 which it is shifted towards the bracket 61 as a result of the spring tension and the width of the slot.

FIG. 2 shows the lid 11 during the loading stage of its pivotal movement, in which pressure exerted in the direction of the arrow 73 urges the lid as far as possible towards the turntable 3 against the carrier plate 13. The disc loader 55 then retains the information-carrying disc 2 firmly on the turntable 3. In the first position shown in FIG. 2 the lower end 63 of the member 61 moves sideways past the wire spring 72 during the pivotal movement in the direction of the arrow 45 in the loading stage. This is possible because the slide 65 has been moved to the position shown in FIG. 2 prior to the loading stage, namely by means an oblique portion 75 of a latching plate 77 which is connected to the slide 14, which has moved the slide 65 in the direction of the left-hand arrow 67 against the force of a spring, not shown.

When the slide 65 now reaches a recess 78 in the latching plate 77, the spring which is not shown urges the slide in the direction of the right-hand arrow 67 and the wire spring 72 is positioned against an edge 79 of the member 61, as is shown in FIG. 3. The carrier 12 is then latched by the latching plate 77. This happens at the end of the loading stage. If the pressure which acts in the direction of the arrow 63 now ceases the spring 25, shown in FIG. 1, urges the lid in the lifting stage of its pivotal movement in the direction of the arrow 43, away from the information-carrying disc 2, the disc loader 55 being lifted off the information-carrying disc. In the lifting stage of the lid the member 61 is pivoted in the direction indicated by the arrow 43 and the spring 72, which has been shifted to the left in the slot 71 as shown in FIG. 3, is disengaged from the edge 79 of the member 61, so that it can return to the right. Thus, when the lid is in final position shown in FIG. 4 the wire spring 72 in its second position is disposed as a latch in the path of the lower end 63 of the member 61. As a result of this, it is impossible to urge the lid 11 again from the final position towards the turntable, because this is precluded by the wire spring 72 which acts as a latch. In the final position shown in FIG. 4 the lid 11 is positioned on the carrier plate 11 by the stop means and, as is shown in FIG. 1, it extends substantially parallel and at some distance from the disc. When the button 67 is depressed again the carrier 12 is released, allowing the lid to be returned to the position shown in FIG. 1.

Figure 5:
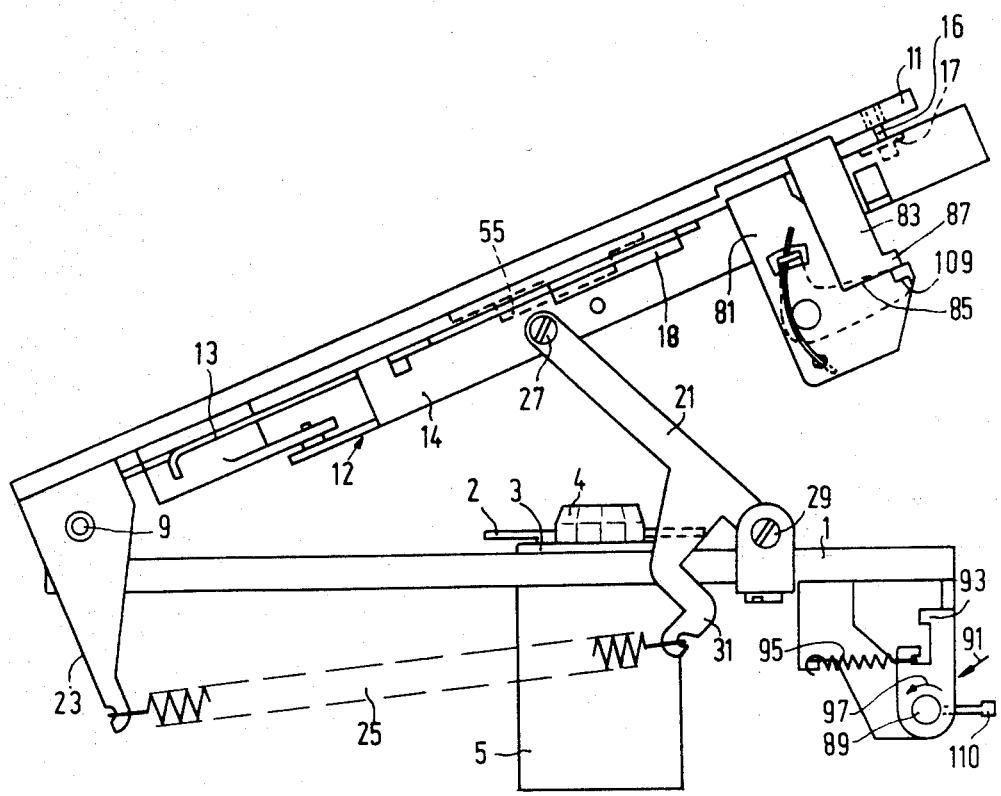
FIG. 5 is a side view of a part of a second embodiment of the invention.
Figure 6:
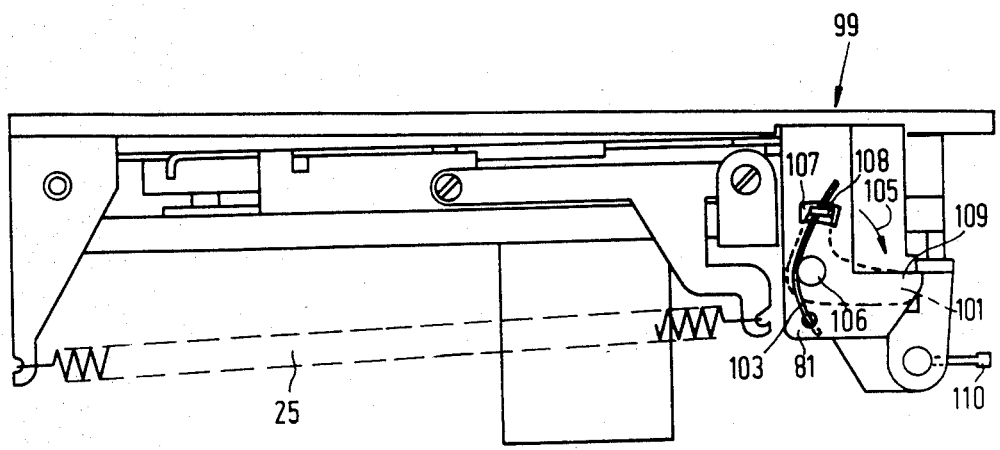
FIGS. 6 and 7 show the part of the disc player of FIG. 5 in two further positions.
Figure 7:
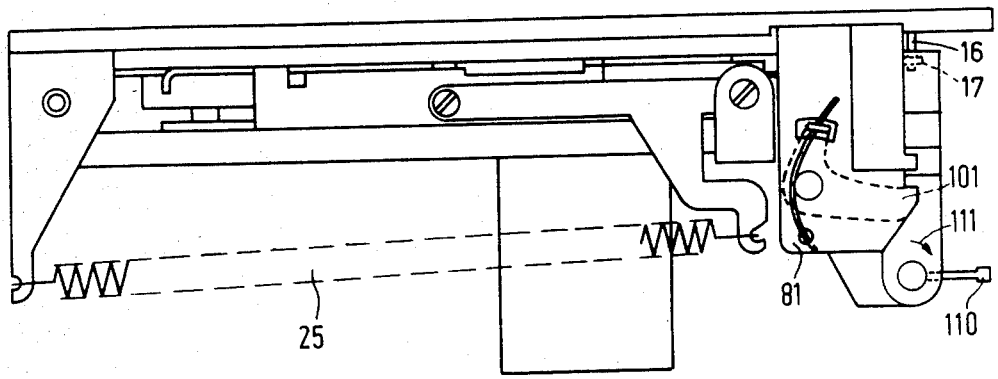

FIGS. 5-7 show a second embodiment of a disc player in accordance with the invention, in which corresponding parts bear the same reference numerals as in the first embodiment. The lid 11 is again provided with a disc loader 55, which is only shown schematically. Latching plates 81, which extend towards the chassis 1, are rigidly connected to the carrier plate 13 on both sides. The lid 11 also carries a thrust member 83 which also extends towards the chassis 1 and which comprises a lower edge 85 constituting a stop element. The lower edge 85 changes into a projection 87 which adjoins the thrust member 83, which projects outwards from the member 83, and which comprises an end portion, not shown, which extends perpendicularly relative to the member 83.

A latching member 91 is pivotally mounted on the chassis 1 by means of a pivot 89. The latching member 91 has a latching portion 83 which projects forwards from the plane of drawing in FIG. 5. A spring 95 urges latching member 91 against a stop, not shown, in the direction of the arrow 97.

As is shown in FIG. 6 the lid 11 has been pressed downwards, for example manually, in the direction of the arrow 99, so far that the disc loader 55 acts on the information-carrying disc 2. In this urged-down position the projection 87 has pivoted a pivotal plate 101 about a spindle 106 as indicated by arrow 105 against the spring force of the spring 103, which spindle connects the pivotal plate to the latching plate 81. The latching plate 81 has a guide slot 107 which engages a lug 108 connected to the pivotal plate 101. In the position shown in FIG. 6 the plate 101 has been pivoted so far that the lug 108 abuts with the right-hand end of the guide slot 107. Initially the plate 81 pivots the latch 93 to the right into its first position and its lower wall is positioned against the latching edge 109 of the latching plate 84.

When the information-carrying disc 2 has been urged in place the lid 11 is released and the lifting stage of the movement of lid begins. The spring 25 causes the lid 11 and the carrier 12 to be moved slightly away from each other up to the stop means (15, 17) on the carrier plate 13, see FIG. 7, which stop means are provided as in the first embodiment. As a result of this movement away from each other in the lifting stage the latch 93 has now assumed a second position between the projection 87 and the latching edge 108, the upper wall of the latch 93 abutting with the projection 87. The pivotal plate 101 remains in the same position, as can be seen in FIG. 7. This movement of the latch 93 towards the second position between the projection 87 and the latching edge 109 guarantees that the lid 11 which carries the disc loader 55 cannot be urged again directly against the latch 109 in the lifting stage or in the final position shown in FIG. 7, as a result of which the disc loader would again act on the disc. The pivotal plate 101 then ensures that the carrier 12 is latched and the latch is moved underneath the projection 97 into the second position at substantially the same time and at the desired instant at the end of the loading stage. In the second lifting stage, shown in FIG. 7, the information-carrying disc can be played back without the risk that the disc loader erroneously comes into contact with a rotating disc.

For opening the lid 11 the latching member 91 is pivoted in the direction indicated by the arrow 111 in FIG. 7 upon actuation of a button 110, so that the spring 25 can urge the lid towards the open position. At the same moment, the pivotal plate 101 pivots under the spring force of the spring 103 in a direction, opposite to the direction of arrow 105, so that the latch 93 cannot return under the projection 87.

It is to be noted tha the disc players shown in the drawing may be constructed as top loaders or as front loaders, i.e. with the lid in a horizontal and a vertical position respectively when it is closed.

What is claimed is:

1. A disc player for a rigid information-carrying disc, said player comprising a turntable which is mounted for rotation on a chassis and a lid for closing said player, said player also including resilient means coupled to said lid, stop means, a latch, and a latching plate; said lid being pivotally connected to said chassis, said player including a disc loader carried by said lid, said loader when said lid is pivoted toward said turntable, acts resiliently on said turntable, said lid when closing performs a pivotal movement in respective loading and lifting stages, said lid including at least one stop element, said lid in said loading stage being pivoted towards said turntable, during which said disc loader urges the disc against said turntable, in said lifting stage consecutive to said loading stage said lid being pivoted away from said turntable by said resilient means into a final position in which said lid is positioned by said stop means, in said final position of said lid said disc loader being clear of the disc, and in which said latch which is movable relative to said chassis, moves to a position in the pivotal path of said stop element, and inhibits a return to said loading stage.

2. A disc player for a rigid information-carrying disc, said player comprising a turntable which is mounted for rotation on a chassis and a lid for closing the player, said player including resilient means coupled to said lid, stop means, a latch, and a latching plate; said lid being pivotally connected to said chassis, said player including a disc loader carried by said lid, said loader when said lid is pivoted toward said turntable, acts resiliently on said turntable, said lid when closing performs a pivotal movement in respective loading and lifting stages, said lid including at least one stop element, said lid in said loading stage being pivoted towards said turntable, during which said disc loader urges the disc against said turntable, in said lifting stage consecutive to said loading stage said lid being pivoted away from said turntable by said resilient means into a final position in which said lid is positioned by said stop means, in said final position of said lid said disc loader being clear of the disc, and in which said latch which is movable relative to said chassis, moves to a position in the pivotal path of said stop element, and inhibits a return to said loading stage, said player further including a latching member and a carrier pivotally connected to said chassis, said carrier in said loading stage being pivoted with said lid toward said turntable, said carrier carrying said latch plate which at the end of said loading stage is latched by said latching member, said latching member being connected to said chassis, said carrier comprising a part of said stop means which in a latched position of said carrier limit the pivotal movement of said lid in said lifting stage and keeps said lid in said final position.

3. A disc player as claimed in claim 2 wherein said latching member carries said latch and in said loading stage of said lid is moved away from said carrier by pivotal movement of said latching plate towards said turntable, said latch being moved to a waiting position, and after said loading stage said latching member being reset under spring force, said latch being moved under said stop element inhibiting a return of said lid to said loading stage.

4. A disc player as claimed in claim 3 wherein said latching member is pivotally mounted on said chassis, said latch pivots under spring force to the position under said stop element.

5. A disc player as claimed in claim 4 wherein said latch is constructed as an element which deflects resiliently relative to said latching member and which is constructed as a slide disposed on said chassis.

6. A disc player as claimed in claim 5 wherein said latching member is provided with a button for releasing said carrier and opening said lid.

7. A disc player as claimed in claim 6 wherein said latch comprises first and second opposed walls, said first wall keeping said latching plate of said carrier latched during said lifting stage of said lid and said second wall, which is disposed in the pivotal path of said stop element of said lid, inhibiting a return of said lid to said loading stage.

8. A disc player as claimed in claim 7 wherein said latching plate on said carrier comprises a pivotal plate which keeps said latch of said latching member in the waiting position via a wall portion during a part of said loading stage and at the end of said load stage is pivoted against spring force towards a pivoted position by said stop element on said lid, so that said latch moves to a position under said stop element and said carrier is latched thereby.

* * * * *